(12) United States Patent
Almendros et al.

(10) Patent No.: US 10,208,460 B2
(45) Date of Patent: Feb. 19, 2019

(54) REMOVABLE DEVICE FOR ATTACHING TWO MECHANICAL PARTS

(71) Applicant: METALOGENIA, S.A., Premia de Mar (ES)

(72) Inventors: Jose Lopez Almendros, Premia de Mar (ES); Francesc Perez Lado, Premia de Mar (ES); Joan Tuto Faja, Premia de Mar (ES); Ester Alonso Frijola, Premia de Mar (ES)

(73) Assignee: METALOGENIA, S.A., Barcelona (ES)

( * ) Notice: Subject to any disclaimer, the term of this patent is extended or adjusted under 35 U.S.C. 154(b) by 701 days.

(21) Appl. No.: 14/673,191

(22) Filed: Mar. 30, 2015

(65) Prior Publication Data

US 2015/0275485 A1 Oct. 1, 2015

Related U.S. Application Data

(60) Continuation of application No. 12/724,322, filed on Mar. 15, 2010, now Pat. No. 9,033,610, which is a division of application No. 11/547,392, filed as application No. PCT/ES2004/000144 on Mar. 30, 2004, now Pat. No. 7,707,755.

(51) Int. Cl.
*E02F 9/28* (2006.01)

(52) U.S. Cl.
CPC .......... *E02F 9/2833* (2013.01); *E02F 9/2825* (2013.01); *E02F 9/2841* (2013.01); *Y10T 29/49947* (2015.01); *Y10T 403/553* (2015.01); *Y10T 403/587* (2015.01); *Y10T 403/7005* (2015.01); *Y10T 403/7013* (2015.01); *Y10T 403/7018* (2015.01)

(58) Field of Classification Search
CPC ..... E02F 9/2816; E02F 9/2833; E02F 9/2841; E02F 9/2883
See application file for complete search history.

(56) References Cited

U.S. PATENT DOCUMENTS

| | | | |
|---|---|---|---|
| 2,373,722 A | 4/1945 | Von Opel | |
| 3,486,205 A | 12/1969 | Smith | |
| 4,918,843 A | 4/1990 | Kiesewetter et al. | |
| 5,205,057 A | 4/1993 | Garman | |
| 5,368,427 A | 11/1994 | Pfaffinger | |
| 5,435,084 A | 7/1995 | Immel | |
| 5,561,925 A | 10/1996 | Livesay | |

(Continued)

OTHER PUBLICATIONS

International Preliminary Examination Report.

*Primary Examiner* — Michael P Ferguson
(74) *Attorney, Agent, or Firm* — Sughrue Mion, PLLC

(57) ABSTRACT

A removable device for attaching two mechanical parts includes a pin removably locking a first part with respect to a second part, a retainer member on the pin and a resiliently loaded tension member which collaborate to prevent the pin from coming out of its locked position; the removable device further includes at least two inclined surfaces, the general shape of which is that of a projection oriented in the axial direction of the pin, such that when the pin rotates, the retainer member runs along the inclined surfaces and the pin moves between the locked position and unlocked position against a force exerted on the pin along a longitudinal axial direction of the pin exerted by the tension member.

13 Claims, 17 Drawing Sheets

(56) References Cited

U.S. PATENT DOCUMENTS

| | | |
|---|---|---|
| 5,718,070 A | 2/1998 | Ruvang |
| 5,956,874 A | 9/1999 | Ianello et al. |
| 5,983,534 A | 11/1999 | Robinson et al. |
| 5,987,787 A | 11/1999 | Mack |
| 6,108,950 A | 8/2000 | Ruvang et al. |
| 6,826,855 B2 | 12/2004 | Ruvang |
| 7,162,818 B2 | 1/2007 | Ruvang et al. |
| 7,178,274 B2 | 2/2007 | Emrich |
| 7,707,755 B2 * | 5/2010 | Lopez Almendros .................... E02F 9/2825 172/772 |

* cited by examiner

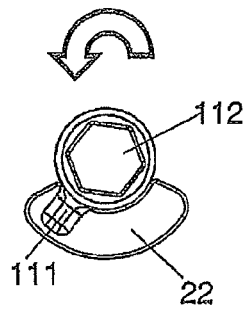
Fig. 37 A
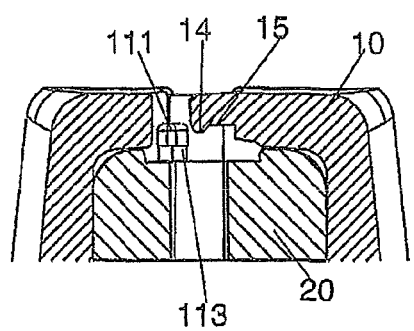
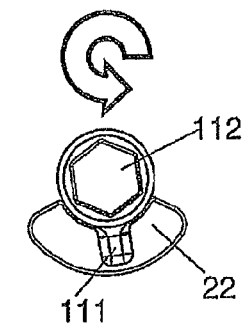
Fig. 37 B
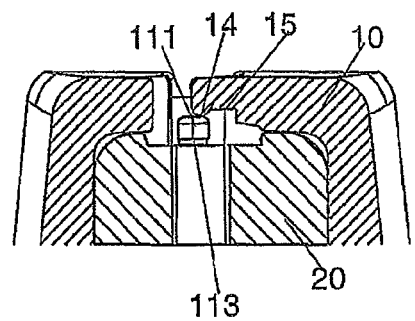
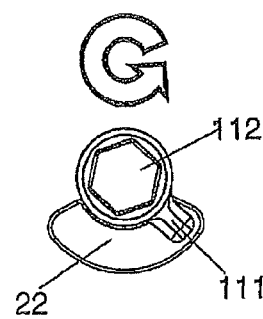
Fig. 37 C
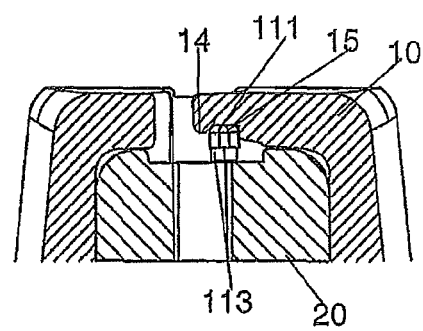

REMOVABLE DEVICE FOR ATTACHING TWO MECHANICAL PARTS

CROSS-REFERENCE TO RELATED APPLICATIONS

This application is a divisional application of U.S. application Ser. No. 11/547,392, filed on Sep. 29, 2006, which is a national stage entry under 35 U.S.C. § 371 of International Application No. PCT/ES2004/000144, filed on Mar. 30, 2004. These applications are hereby incorporated by reference.

BACKGROUND OF THE INVENTION

Field of the Invention

The present invention refers to a removable device for attaching two mechanical parts, comprising a pin removably locking a first part with respect to a second part, a retainer member associated to the pin and a resiliently loaded tension member, which collaborate to prevent the pin from coming out of its lock position.

Description of Related Art

Excavating machines and the like, such as those used in public works and mining, are used to pull out, move and load earth and stones. These machines are usually provided with a bucket joined to a mechanical arm. The bucket is provided with a beveled lip or blade on a front edge intended for striking against and penetrating the earth and stone mass. It is usual to mount teeth associated to the blade projecting forwardly therefrom to prevent excessive wear of the blade and to aid in penetrating the earth. However, said blades are also subjected to wear and breaks, whereby they must often be replaced and furthermore, depending on the work which the machine is to perform, it may be desirable to change the type or shape of the teeth. To facilitate said replacement, fixed to the blade of the bucket in a more or less permanent manner there is a tooth bar and teeth, such that each tooth is removably mounted on the tooth bar by means of a pin. Said pin usually traverses the holes of the tooth and a passage traversing the tooth bar in order to fix the tooth to the tooth bar.

A retainer device is used to prevent the pin from coming out of its assembly position, fixing the pin in its said assembly position. The retainer device usually includes resilient members which usually apply a force pushing the pin towards its assembly position. When the usual arrangements operate under difficult conditions, the pin has the tendency to be displaced against the pushing force of the retainer device. Then the pin can come out of the tooth bar, the pin and tooth possibly being lost. The loss of a tooth and/or pin may be very important according to the operating site thereof, such as mines or quarries for example, since they may damage other machines, such as crushers, operating in the same production site as the machine using the tooth.

U.S. Pat. No. 4,918,843 discloses an arrangement in which the retainer device is a spring washer which is placed in a cavity of the tooth bar defining a housing receiving said washer and positions it concentrically with respect to the corresponding holes of the tooth and the tooth bar, said washer operating and therefore being deformed in the direction perpendicular to the axial axis of the pin. The diameter of the pin is greater than that of the hole of the washer, such that the pin fits into the washer by means of a recess existing on the surface of the pin when a mechanical stress is applied, usually consisting of striking the pin with a hammer or mallet. This requirement of striking the pin in order to fit it into the washer is evidently uncomfortable and arduous since it is usually necessary to strike the pin horizontally, a difficult operation since the space between tooth bars located on the blade of a bucket is limited, requiring the use of auxiliary tools which only make the assembly and removal of the pin more difficult, increasing the risk of an accident for the operator or operators. This retainer device is affected by the quality of the material of the spring washer used since the pin is retained by the same and the retention of the pin will be more or less reliable according to the same. The recess existing in the pin for inserting the washer likewise weakens the pin, the latter possibly breaking due to the work carried out by the tooth-tooth bar assembly and the stress concentration in said recess.

U.S. Pat. No. 5,983,534 discloses a lock system for the pin which is rotary and does not require hammering. In this system, the pin incorporates a resilient member able to exert a force against one portion of the tooth or tooth bar for the purpose of tightening the coupling between both, and a resiliently loaded retainer member radially projecting from a cylindrical wall of the pin and susceptible to being introduced in a cavity of the tooth or tooth bar when the pin, once inserted, is rotated a predetermined angle by means of the application of a tool on an axial end of the pin. A notch allows the introduction of the retainer member when the pin is axially inserted into a passage defined by both the tooth and tooth bar when they are coupled. Once the pin is inserted, a ramped surface acts as a cam to push the retainer member inwardly of the pin as the latter is rotated until reaching the angular position of said cavity, where the retainer member is shot into the cavity due to the effect of said resilient loading. The removal thereof is provided for by either breaking of the retainer member due to the action of striking with a hammer in the axial direction on the pin or the collaboration of inclined surfaces of the housing with corresponding inclined surfaces of the head of the retainer member to push the latter inwardly, either by an axial force exerted on the pin, or by applying a turning torque thereto.

This arrangement entails great complexity for the pin, since it incorporates two moving parts housed and retained in respective cavities of the body of the pin and resiliently loaded by means of coil springs, which negatively affects its production cost. Furthermore, the moving parts and resilient springs housed in the pin are highly susceptible to being affected by the accumulation of dust and earth, which combined with moisture can form a clay-type paste which may lock the springs and the movement possibilities of the moving parts when it dries, which entails the need to destroy them by hammering when it is necessary to remove the teeth.

In this type of systems, the stresses required for removal exceed assembly stresses since in addition to the difficulties of the design and construction, removal is affected because during operation, the pin and retainer member may become deformed and earth can additionally be introduced in the housing of the pin, making its extraction difficult.

SUMMARY OF THE PREFERRED EMBODIMENTS OF THE INVENTION

In order to overcome the drawbacks mentioned and to simplify the assembly and removal of a tooth in a tooth bar, and more generally of two mechanical parts, one female and the other male, from one another, the attachment device according to the present invention is characterized by the fact that it further comprises at least two inclined planes, the general shape of which is that of a projection oriented in the axial direction of the pin, such that when the pin is rotated, the retainer member runs along said inclined planes and the pin moves between two positions, the pin lock position and the unlock or introduction position, against the force axial to the pin exerted by said tension member. Said retainer member has four, two-by-two parallel faces, the two upper and lower faces being the ones which allow exerting the pressure on the tension member as well as facilitating the sliding of the retainer member, and therefore the rotation of the pin, in order to reach the lock position.

The tension member should not be significantly resiliently loaded once it is located in its assembly position since if it were very loaded, it could bring about the following results:

Over time, the possible loss of the resilient properties of the tension member in systems with little wear, and The tension member being relaxed allows the retainer member to return to its rest position due to the existence of forces with random components, however if the tension member were very resiliently loaded in its working position, it would be subjected to repetitive forces (of compression and rotation) which could accumulate over time and move the retainer member from its lock position to its introduction position.

Thanks to these features, both the assembly of the two parts and the removal operation are carried out in a simple manner without needing to strike the pin, but at the same time the attachment during the job is solid and reliable. This is possible because in addition to its constructive features, dirt which the device will be subjected to during the job does not affect the operation thereof. This is because the tension member occupies a space which is not affected by said dirt and therefore allows it to perform its compression function regardless of the existing dirt, since when the tension member is compressed, a previously inexistent space is opened, allowing the movement of the accumulated dirt.

As the attachment device does not require hammering for its assembly or removal, it also allows assembling a larger number of tooth bars or male parts on the bucket of a machine.

The two inclined planes, in combination with the resilient loading of the tension member and the retainer member, make it very difficult for the pin, with said retainer member, to come out of its lock position. During working operation thereof, the pin can receive both longitudinal and transverse stresses, but it is very unlikely that it will receive stresses causing a rotation thereof, such that the retainer of the pin will not be able to be displaced from its lock position to the introduction position of the pin in the cavity formed by the male part and the female part.

One feature of the retainer device is that it can be adapted to already existing retainer systems.

In one embodiment, the inclined planes are formed on a face of the tension member.

In an alternative embodiment, the inclined planes are formed on at least one of the contact surfaces between the male part and female part, i.e. in at least one of the inner surfaces of the female part or in at least one of the outer surfaces of the male part. In this case, the same surface of the part containing said inclined planes can be provided with a cavity housing the retainer member of the pin in its lock position.

The inclined planes preferably form two ramps facing each other with a projection between both, and one of the slopes of which is steeper than the other one. Greater ease during assembly in the rotation of the pin from the pin introduction position to the lock position is thus assured, and the opposite movement is hindered so as to prevent the pin from being released from the housing between the male part and the female part, causing one of the parts to be released from the other one while working.

In one embodiment, the pin comprises a body, the shape of which is that of a surface of revolution. Said body can be frustoconical in order to facilitate the introduction and extraction of the pin, or cylindrical; the cylindrical shape will be more appropriate in the embodiments in which the pin is axially displaced during the assembly or removal operation. Furthermore, the pin is preferably a through pin, i.e. it traverses the two sides of the female part, facilitating the extraction of the pin by pressing on the side opposite to the introduction side should the pin become stuck. The retainer member object of the present invention may also be used in fixing systems between a male part and a female part in which the pin is not a through pin.

The section of the pin may have different geometric shapes, being preferable for it to have a circular section due not only to a better resistance to the stresses to which it is subjected as well as to a better fit to the retainer device, but also for a simpler manufacture. Another section which the pin have is oval or elliptical, such that when the pin rotates after it is introduced, the area of longer length comes into contact with the wall of the housing of the male part. Other geometric sections the vertices of which are rounded can also be used in the present retainer device.

An embodiment variant of the invention with a frustoconical pin provides for including at least two inclined planes in ramp form, separated from one another by a flat section with self-tightening effects to offset the wear effects and thus keep the assembly taut. By means of this embodiment, in addition to rotating, the pin performs an axial movement which assures the retention since the locking of the pin is more difficult as it requires a rotation and simultaneous axial displacement. This variant prolongs the lifetime of the coupling since it allows using a larger number of female parts with a single male part. This is the case because upon allowing tightening of the fixing between the male part and the female part, it allows maintaining the tension between both, offsetting the increased allowance generated by the wear of the male part during its lifetime as different female parts are changed.

In the sense of simplifying the device of the invention as much as possible, the retainer member constitutes a transverse projection of the pin and is preferably interlocked thereto.

It is provided that one of the ends of the pin presents a coupling for a tool, by means of which a rotational movement can be applied to said pin about its longitudinal axis.

An embodiment variant provides that the tension member is a curved segment of a resilient material in combination with a metal segment which is arranged on said resilient material. As it constitutes a washer segment, the tension member is mounted with no difficulty around the body of the pin and due to its metal portion, allows facilitating the rotational movement of the retainer on the tension member.

It is also possible for the tension member to be formed by a washer either of a resilient material combined with a metallic material, or of only a metallic material in the form of a spring for hot applications.

Furthermore, the tension member may not have a metal portion, but rather be constituted solely of an elastomeric material.

The tension member can have any shape in addition to those mentioned, washer or curved segment, as long as said tension member allows the rotation of the retainer member.

In one embodiment, the tension member is mounted or constructed on the pin, specifically on the retainer member interlocked to the pin.

One of the two parts preferably comprises a cavity for housing the tension member.

For constructive purposes, one of said parts may be provided with a hole with a notch for being able to introduce the pin with the projection or retainer member.

In a particularly useful embodiment of the invention, said first part is a tooth and said second part is a tooth bar, particularly of a bucket of an excavating machine or the like.

Also provided is the construction of a tooth adapted to be used in said retainer device.

BRIEF DESCRIPTION OF THE DRAWINGS

In order to better understand that which has been set forth, several drawings are enclosed in which several practical embodiments have been represented schematically and only by way of non-limiting example.

In the drawings:

FIG. 31a shows a detail of the tooth of FIG. 13;

FIG. 31b shows an enlarged detail of the tooth of FIG. 13a;

FIGS. 37A-C show three successive views showing the operation of a device according to an embodiment of the invention with the pin of FIG. 35;

DETAILED DESCRIPTION OF THE PREFERRED EMBODIMENTS OF THE INVENTION

Figure 1:
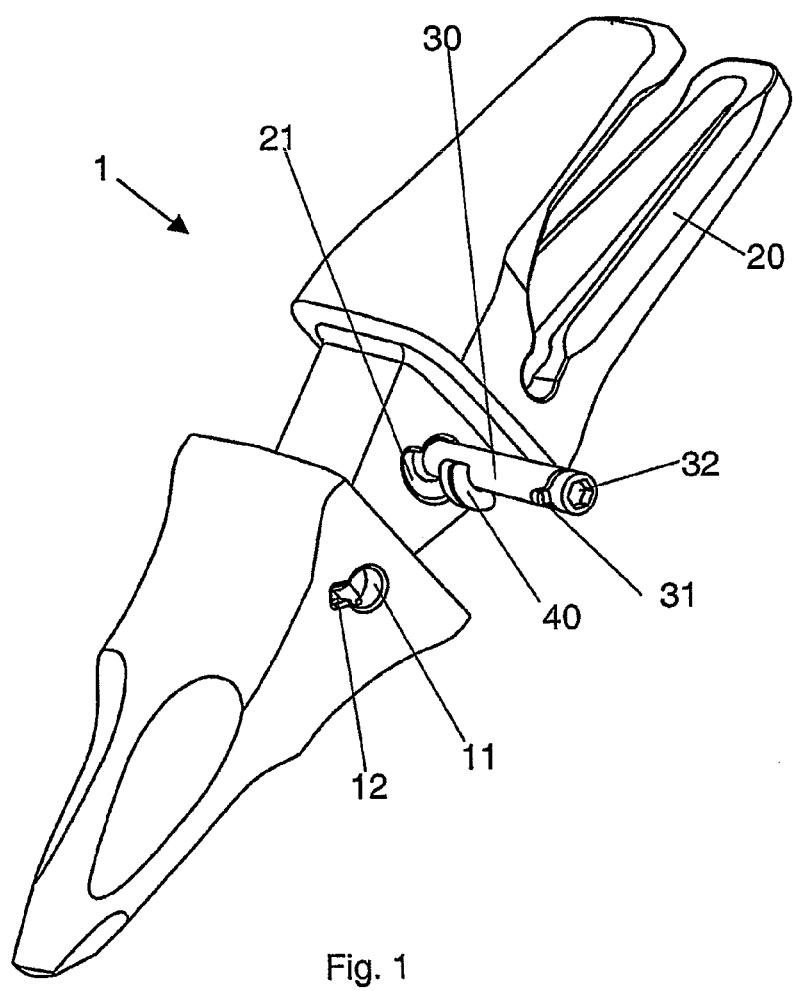
FIG. 1 shows a perspective view of a tooth-tooth bar assembly of a bucket of an excavating machine with a device according to an embodiment of the invention.
Figure 2:
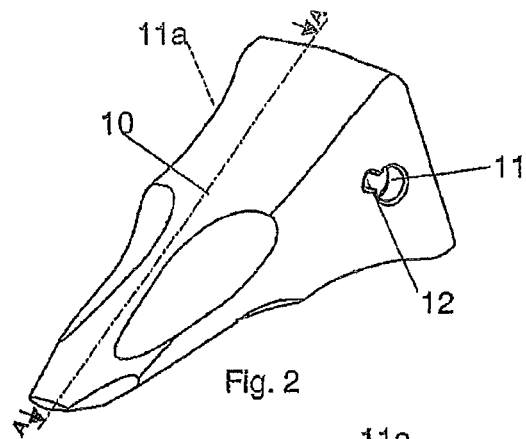
FIG. 2 shows a perspective view of the tooth of FIG. 1.
Figure 3:
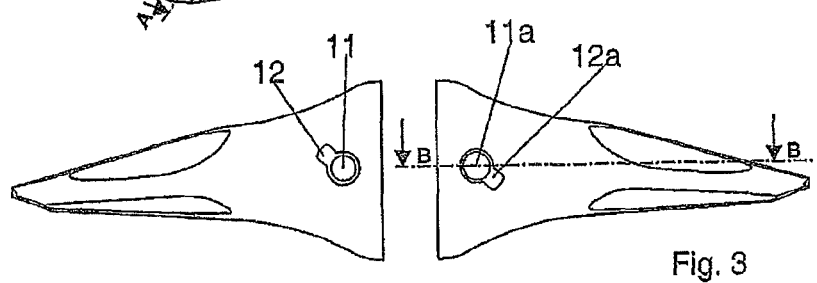
FIG. 3 shows two side views of the tooth of FIG. 1.
Figure 4:
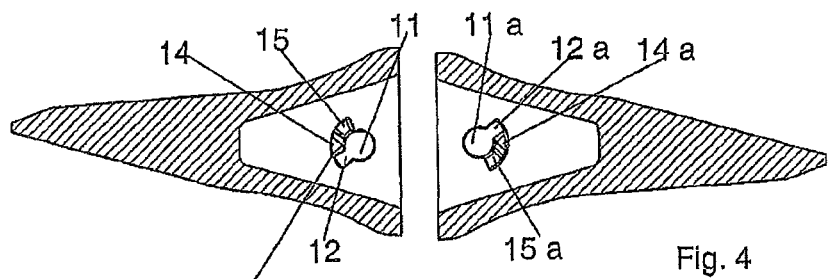
FIG. 4 shows two sectional views of the tooth of FIG. 2 according to A-A.
Figure 5:
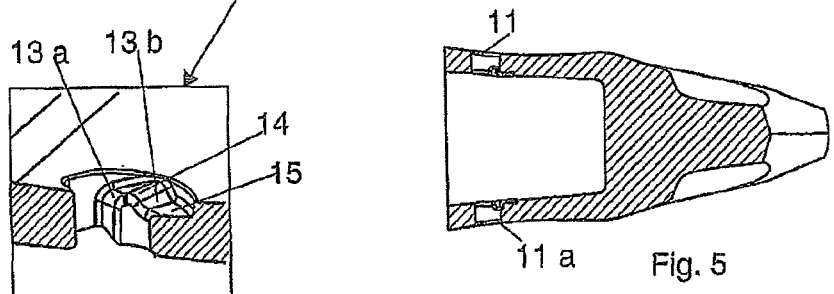
FIG. 5 shows a sectional view of the tooth of FIG. 3, according to B-B.
Figure 6:
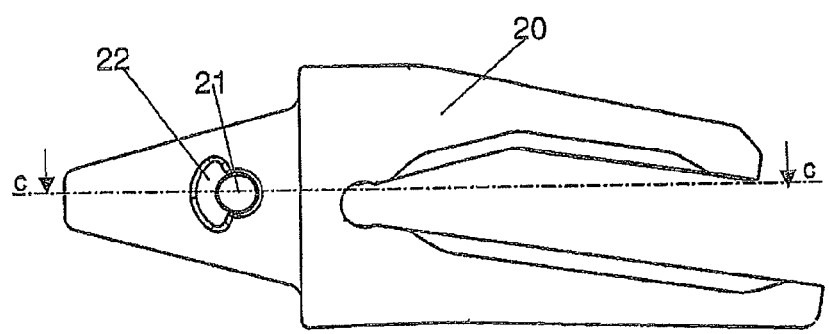
FIG. 6 shows a side view of the tooth bar of FIG. 1.
Figure 7:
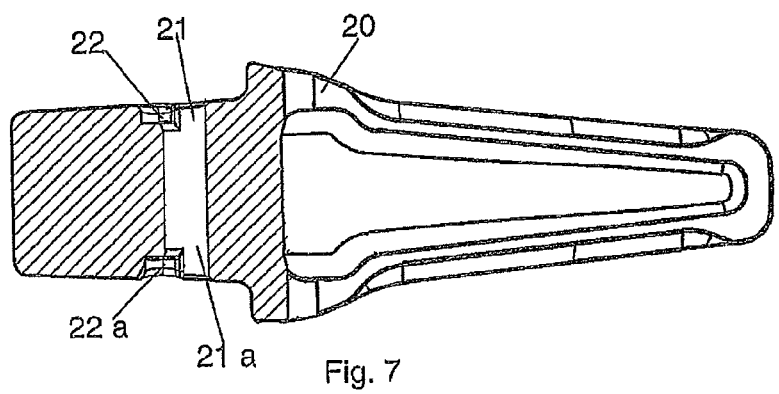
FIG. 7 shows a sectional view of the tooth bar of FIG. 6 according to C-C.

Embodiments of the invention applied, by way of example, to the assembly and removal of a tooth in a tooth bar of a bucket of an excavating machine are described below, but it is clear that the device can be used for the removable attachment of another type of mechanical parts.

In reference to FIGS. 1 to 11, a tooth-tooth bar assembly 1 comprises a tooth 10, a tooth bar 20, a pin 30 and a resilient tension member 40, the latter formed by a metal member 43 located on a resilient member 44.

The pin 30 is provided with a body, the shape of which is that of a surface of revolution, and of a transverse projection 31 constituting a retainer member for the pin itself. One of the ends of the pin 30 contains a recess 32 with the shape suitable for coupling a tool by means of which a rotational movement can be applied to the pin about its longitudinal axis.

The tooth 10 is provided with a hole 11 with a notch 12 for being able to introduce the pin 30 with the projection or retainer member 31. It can also include a hole 11a with a notch 12a on the surface or side wall opposite to the previous one, such that it allows the introduction of the pin through either of the two sides. The tooth bar 20 includes a hole 21 for the pin 30 and a cavity 22 for housing the tension member 40. It is likewise possible to also include a hole 21a and a cavity 22a on the surface of the tooth bar opposite to the previous one.

With the pin mounted in the assembly, the tension member 40 should not be loaded or significantly resiliently loaded, said tension member 40 remaining between the cavity 22 and the retainer member 31. Said tension member 40 is a curved segment and has the function of hindering the backwards movement, possibly caused due to the vibrations occurring in the excavation process, of the retainer member 31 from its assembly position (position C in FIG. 11) to its introduction or extraction position (position A in FIG. 11).

The tooth-tooth bar assembly 1 is mounted first by coupling the tooth 10 and the tooth bar 20 with the tension member 40 previously housed in the cavity 22 of the tooth bar 20, then by introducing the pin into the holes of the tooth and the housing of the tooth bar and, lastly, rotating the pin by means of a suitable tool until the assembly or lock position in which the retainer member 31 of the pin 30 remains trapped between the tooth and the tooth bar. Due to the shape of the hole 11 of the tooth 10, the pin 30 can only be introduced in the precise position in which the retainer member 31 passes through the notch 12.

In this embodiment, shown in FIG. 11 in three positions A, B and C, the tension member 40 formed by the metal portion 43 and resilient portion 44 is planar and an inner surface of the tooth 10 is provided with two inclined surfaces 13a and 13b ending in a projection 14. On the same inner surface of the tooth, next to inclined surface 13b, there is a cavity 15 for housing the retainer member 31 of the pin 30 in its lock position (position C in FIG. 11).

Inclined surface 13a presents a first slight ramp which does excessively obstruct the forward movement of the retainer member 31 from position A to said lock position C, and a steep second ramp 13b making the backwards movement of the retainer member from position C to said unlock position A more difficult. The tension member 40 is housed in the cavity 22 and cannot be displaced, but it can be compressed since it is resilient, and this compression allows the forward movement of the retainer member 31 along the inclined surfaces 13a and 13b, passing through the projection 14 (position B in FIG. 11). Furthermore, as previously mentioned, when the pin is in its final lock position, the tension member 40 does not maintain a significant resilient compression load.

In order to remove the tooth 10, the pin 30 is simply rotated from its lock position to the introduction or unlock position with enough force so that the retainer member 31 compresses the tension member 40 even more and overcomes the steep ramp of surface 13b, then all that remains is to easily extract the pin from the tooth bar and from the tooth.

Figure 8:
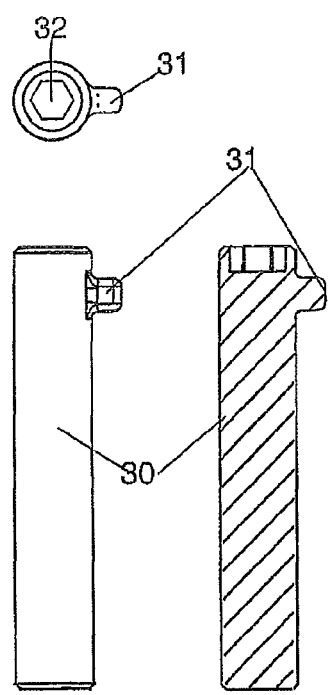
FIG. 8 shows a plan profile and sectional view of a cylindrical pin.
Figure 9:
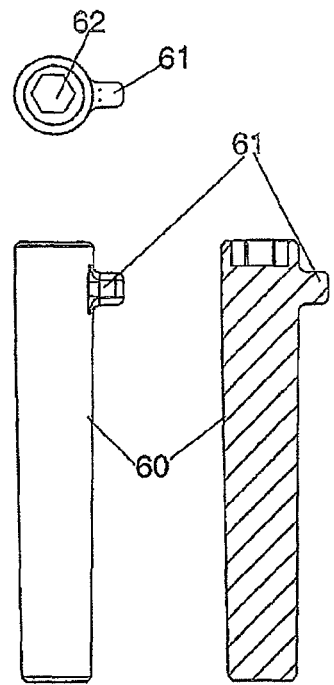
FIG. 9 shows a plan profile and sectional view of a frustoconical pin.
Figure 10:
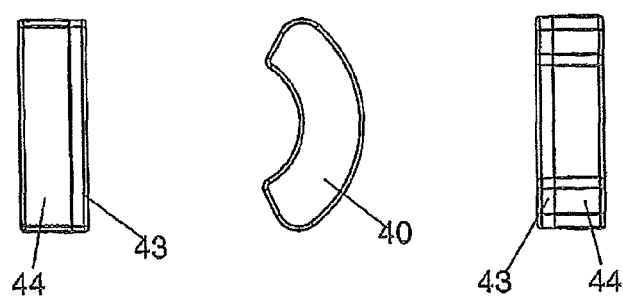
FIG. 10 shows three views of a tension member according to an embodiment of the invention and applicable in the assembly of FIG. 1.
Figure 11A:
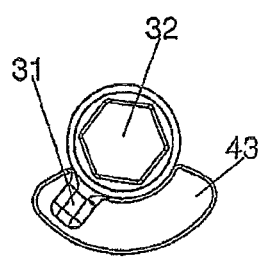
FIGS. 11A-C show three successive views showing the operation of a device according to an embodiment of the invention.
Figure 11A:
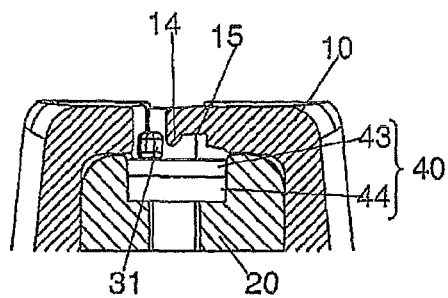
Figure 11B:
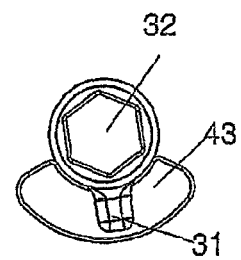
Figure 11B:
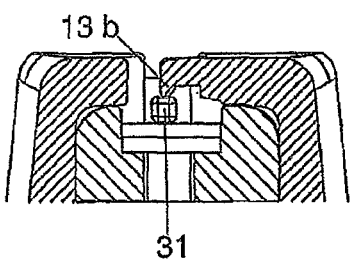
Figure 11C:
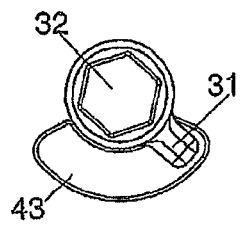
Figure 11C:
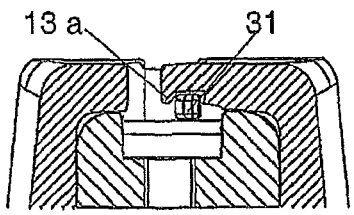
Figure 12:
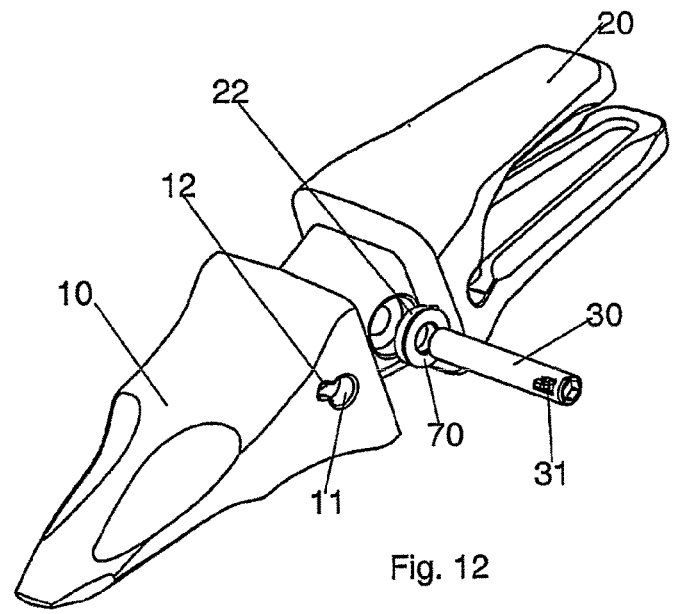
FIG. 12 shows a perspective view of a tooth-tooth bar assembly of a bucket of an excavating machine with a device according to an embodiment of the invention.
Figure 13:
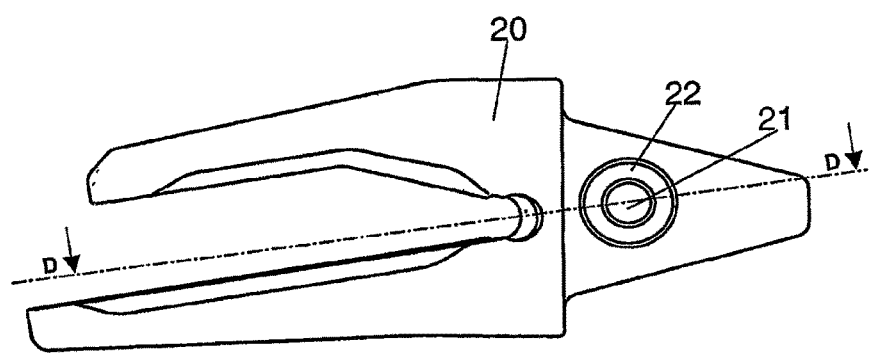
FIG. 13 shows a side view of the tooth bar of FIG. 12.
Figure 14:
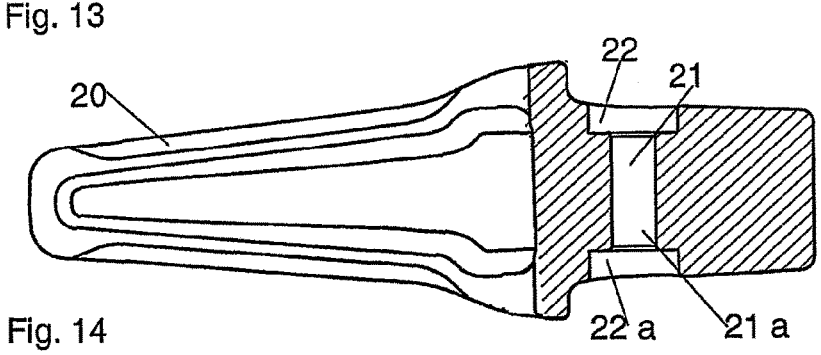
FIG. 14 shows a sectional view of the tooth bar of FIG. 13 according to D-D.
Figure 15:
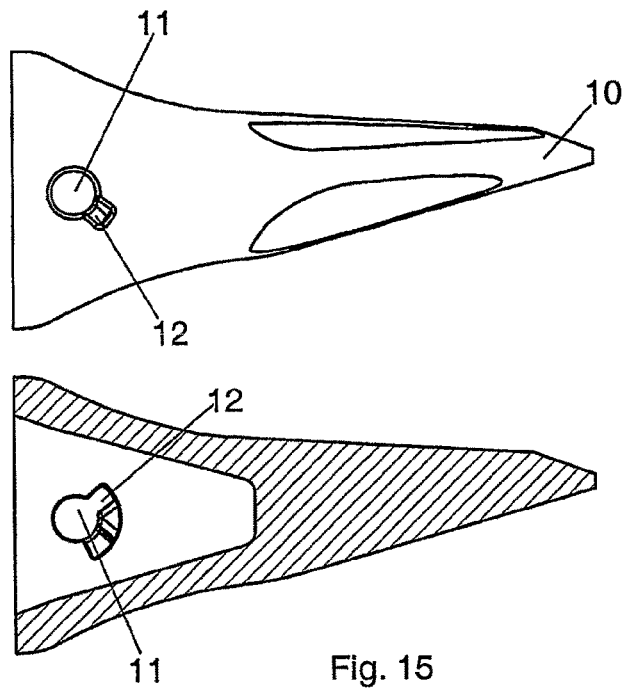
FIG. 15 shows a sectional view of the tooth and of the tooth of FIG. 12.
Figures 16, 17, 18:
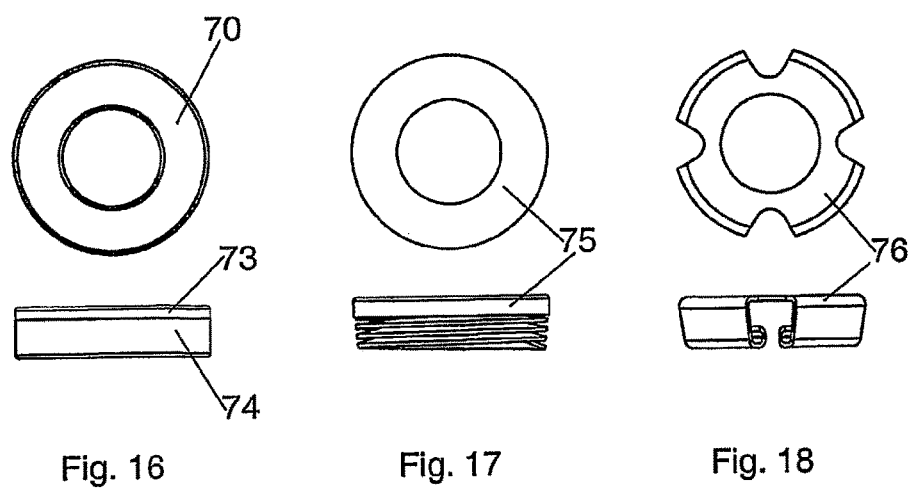
FIG. 16 shows a tension member applicable in the assembly of FIG. 12.
FIG. 17 shows a tension member applicable in the assembly of FIG. 12.
FIG. 18 shows a tension member applicable in the assembly of FIG. 12.
Figure 19:
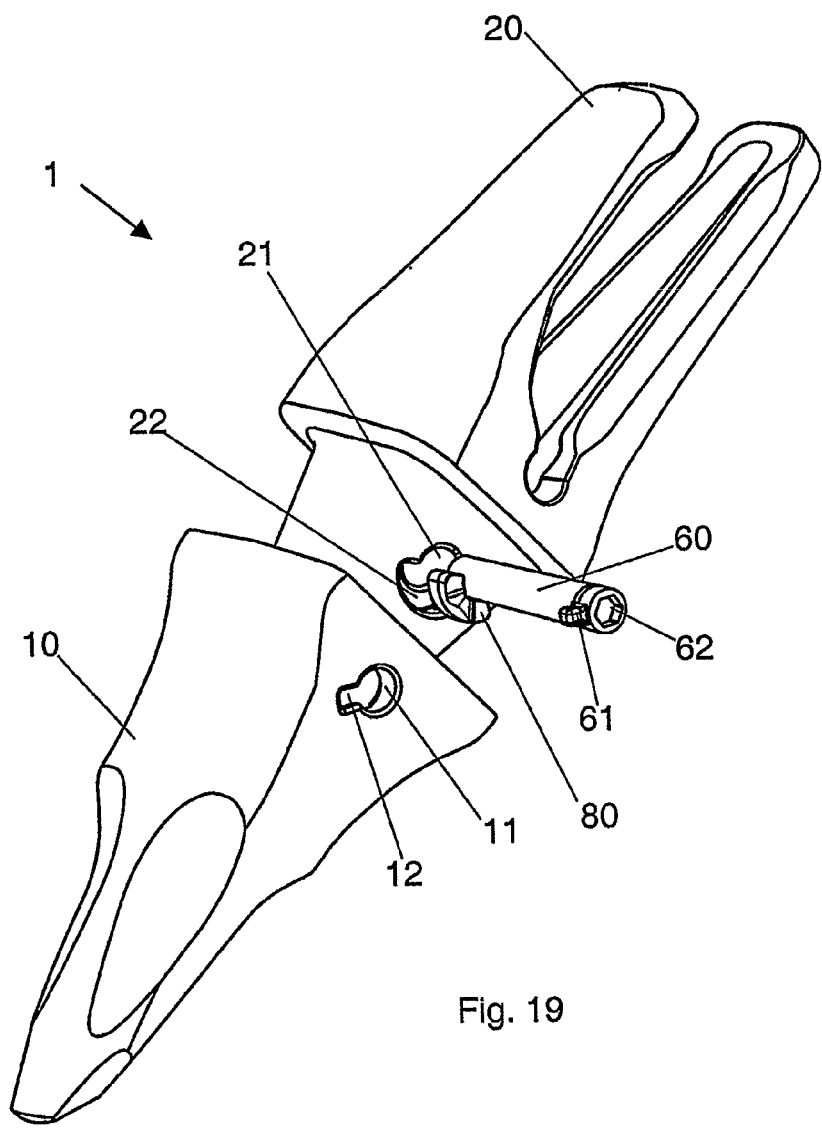
FIG. 19 shows a perspective view of a tooth-tooth bar assembly of a bucket of an excavating machine with a device according to an embodiment of the invention.
Figure 20:
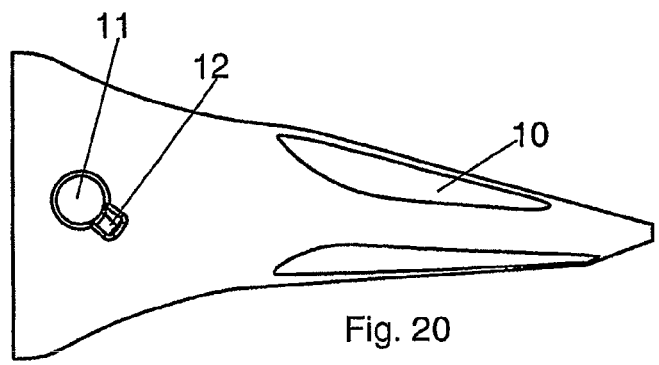
FIG. 20 shows a side view of the tooth of FIG. 19.
Figure 21:
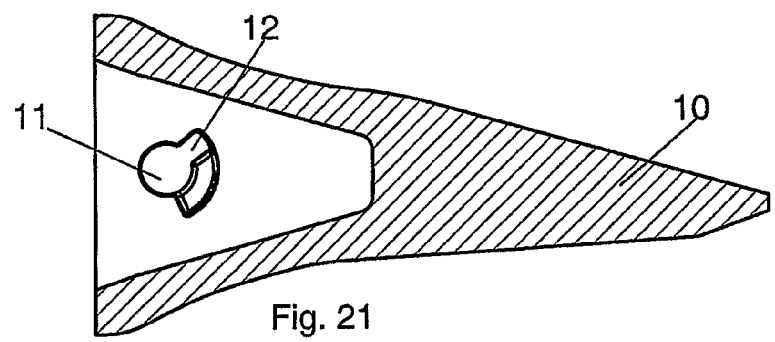
FIG. 21 shows a sectional view of the tooth of FIG. 20.
Figure 22:
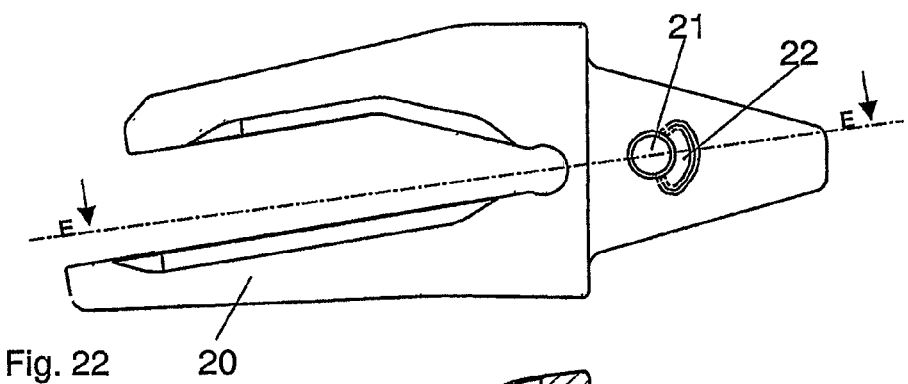
FIG. 22 shows a side view of the tooth bar of FIG. 19.
Figure 23:
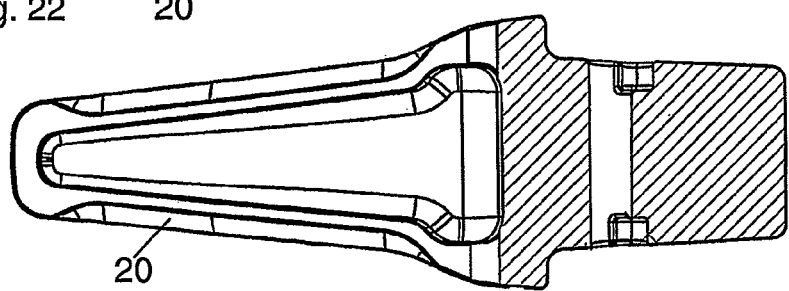
FIG. 23 shows a sectional view of the tooth bar of FIG. 22 according to E-E.
Figure 24:
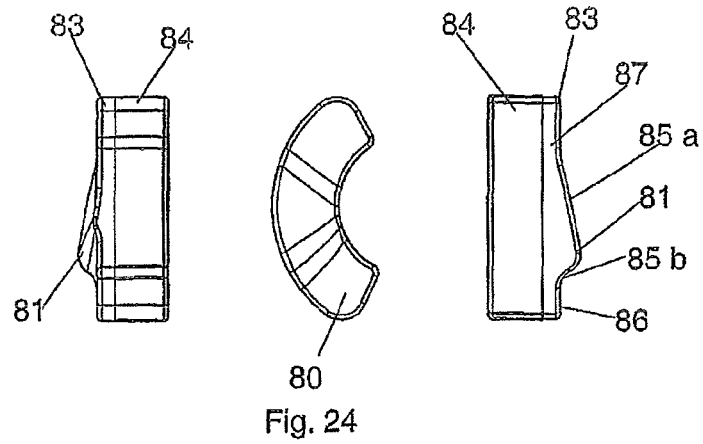
FIG. 24 shows three views of a tension member applicable to the assembly of FIG. 19.

In this embodiment, the movements of the pin 10 are translational and rotational and the body of the pin will preferably be cylindrical (see FIG. 8). The pin has two translational movements until its assembly position, therefore conferring greater security to the retainer device given that its extraction requires a translational movement in one direction and subsequently a translational movement in the direction opposite to the previous one, thus making the accidental removal of the pin, and therefore of the tooth while working, difficult. The pin in this embodiment is preferably cylindrical given that the spaces for the possible housing of dirt between the pin and the housing thereof in the tooth bar are limited to the outer surface of the pin. If the pin used in this embodiment were frustoconical, there could be problems in the extraction thereof since the dirt which is introduced while the device is working could prevent the translational movement of the pin as it fills up those spaces existing between the pin and the housing in the tooth bar, creating dirt wedges around the outer surface of the pin.

In another embodiment of the invention as shown in FIGS. 12 to 18, rather than being a curved segment, the tension member can be a circular washer 70 made up of a resilient portion 74 and a metal portion 73. When the tooth and tooth bar are applied to hot-working operations, said tension member 70 with a metal portion and another resilient portion may be replaced by a metal washer, such as a spring 76 or spring 75 for example.

In this embodiment, the movements of the pin 30 are also axially rotational such that the body of the pin will preferably be cylindrical, since if it were frustoconical said translational movement would only be possible at the expense of a poor fitting of the pin 30 in the tooth 10 and the tooth bar 20.

Figure 25:
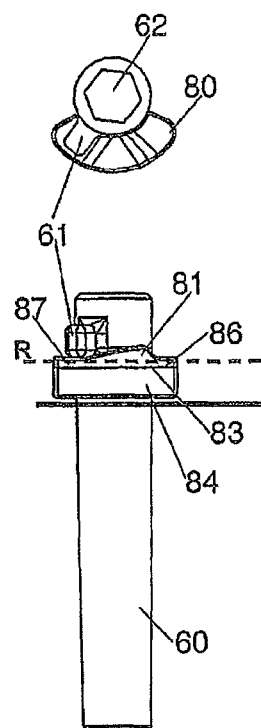
FIGS. 25A-C show three successive views showing the operation of a device according to the embodiment of the invention shown in FIG. 19.
Figure 25:
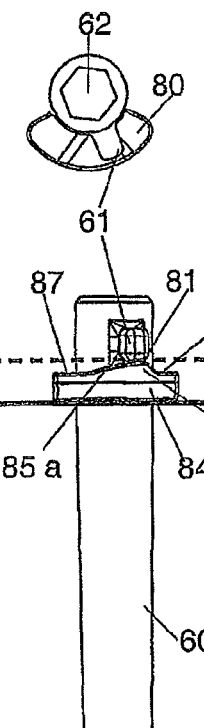
Figure 25:
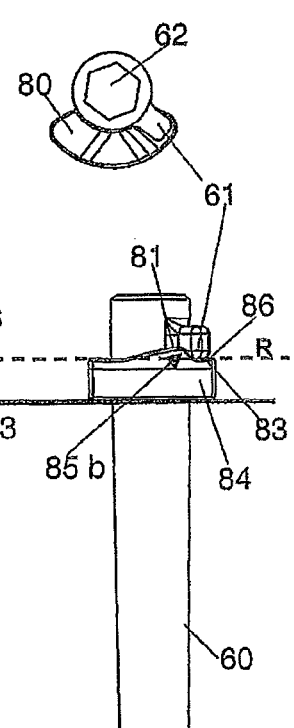
Figure 26:
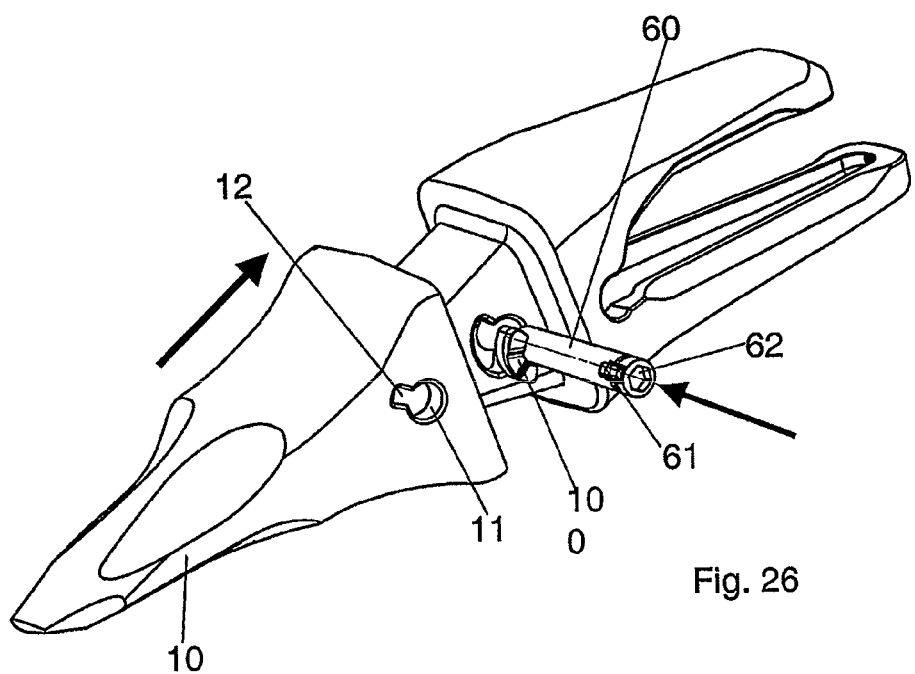
FIG. 26 shows a perspective view of a tooth-tooth bar assembly of a bucket of an excavating machine with a device according to an embodiment of the invention.
Figure 27:
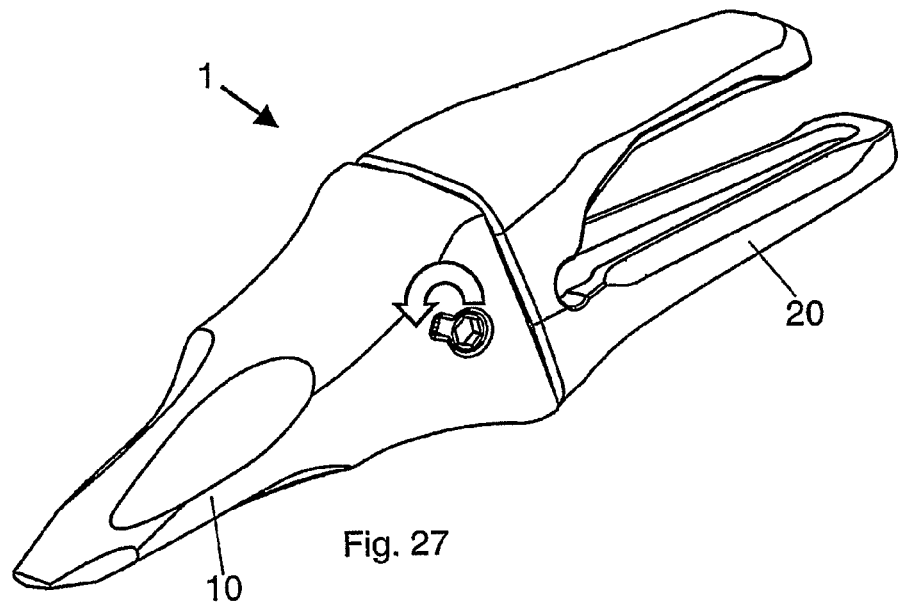
FIG. 27 shows a perspective view of a mounted tooth-tooth bar assembly of a bucket of an excavating machine with a device according to FIG. 26.
Figure 28:
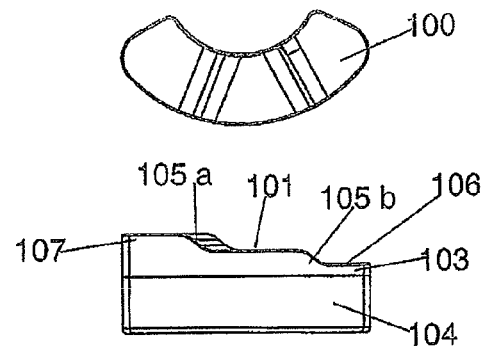
FIG. 28 shows a tension member applicable in the assembly of FIG. 26.

In another embodiment represented in FIGS. 19 to 25, the tension member 80 is provided with a planar entry surface 87 and two inclined surfaces 85a and 85b, which end in a projection 81, said inclined surfaces separating the initial introduction or unlocking position (corresponding to planar surface 87) of the retainer member 61 together with the pin 60 (position A in FIG. 25) from its final assembly or lock position, planar surface 86 of the tension member 80 (position C in FIG. 25). The assembly and removal process of this embodiment is similar to that of the previously explained embodiment, and in this embodiment, the lock position of the pin 60 is secure by virtue of the interaction between the resilient tension member 80, retainer member 61, planar surface 86 and surface 22. In said FIG. 25, it can be observed how the tension member 80 is compressed with respect to reference line R-R when the pin axially rotates and said tension member is compressed due to the action of the retainer member 61, without there being axial displacement of the pin 60. In these cases in which there is only a rotational and not axial movement of the pin, it is preferable for the pin to be frustoconical since during the unlocking operation, its being frustoconical facilitates its extraction, since the contact between the surface of the pin and of the housing is less and therefore should the gap between the pin and walls of the housing be full of dirt, the effort required to axially displace the pin will be less. Likewise, should the pin become deformed during the working of the retainer device, if said pin were cylindrical, rotation thereof would be more complicated since there would be greater contact between the pin and the housing in the tooth bar due to the constant section of the pin, however since it is frustoconical, the rotation will not be hindered due to there being less contact with the housing in the tooth bar.

In this embodiment, a frustoconical pin 60 has been used (FIG. 9), although as in all the explained embodiments, frustoconical and cylindrical pins may be used indistinctly, although evidently the use of one rather than the other will be more advantageous according to the embodiment.

In another embodiment of the invention represented in FIGS. 26 to 29, the tension member 100, with a metal portion 103 and a resilient portion 104, preferably with a curved segment shape, is provided with two downwardly inclined surfaces 105a and 105b separated from one another by a planar section 101 in its metal portion 103. There is also a planar area 106 at the end of said tension member 100. The operation is identical to that already described for the previous embodiments, but it allows different assembly positions in order to increase the pressure on the retainer member 61 of the preferably frustoconical pin 60 of the tooth 10. By means of this configuration, it is possible to displace the pin inwardly as the tooth 10 or tooth bar 20 becomes worn due to the effect of the shocks and vibrations generated between the tooth 10 and tooth bar 20.

Figure 29:
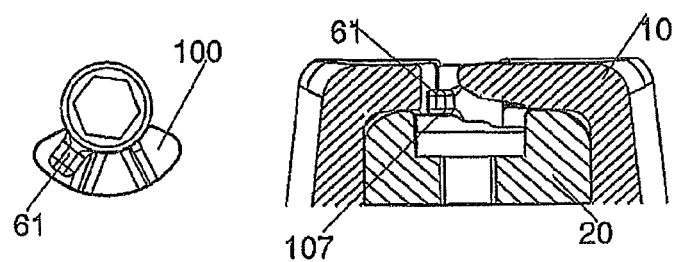
FIGS. 29A-C show three successive views showing the operation of a device according to the assembly of FIG. 26.
Figure 29:
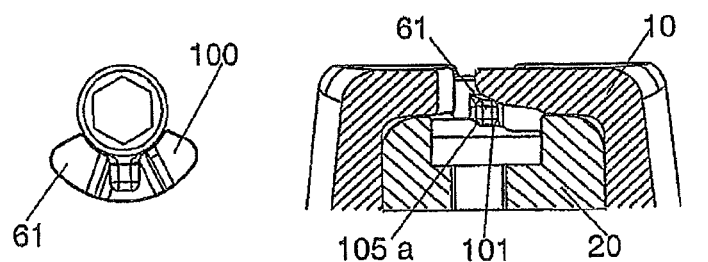
Figure 29:
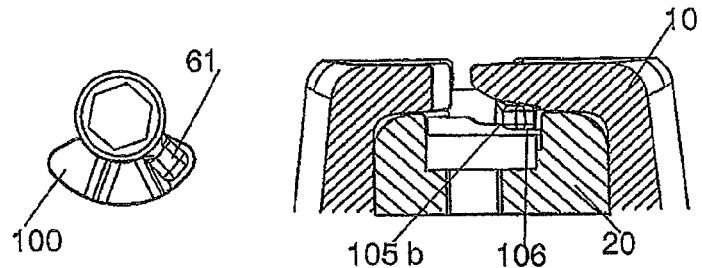

Three positions A, B and C are represented in FIG. 29 in which the axial rotation and axial translation displacement of the pin 60 along the metal surface 103 of the tension member 100 is observed.

Figure 30:
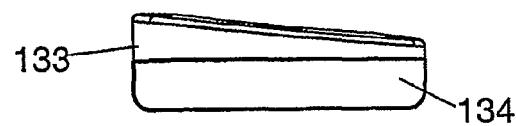
FIG. 30 shows two views of a tension member according to an embodiment of the invention.
Figure 30:
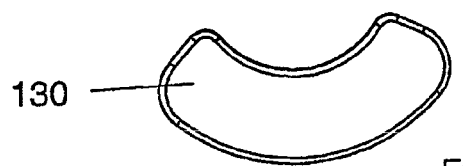
Figure 31:
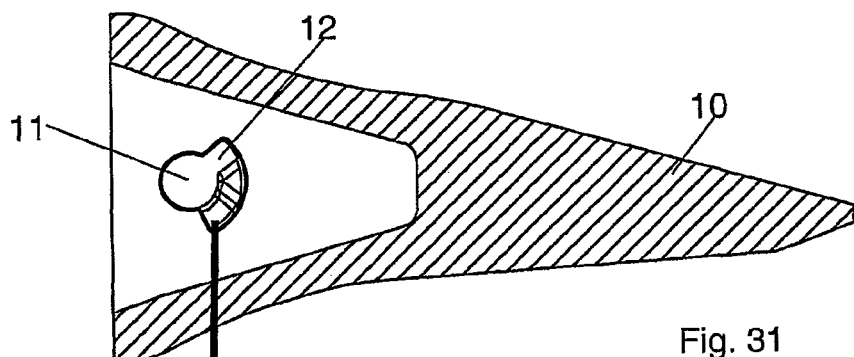
FIG. 31 shows a sectional view of a tooth according to an embodiment of the invention.
Figure 31:
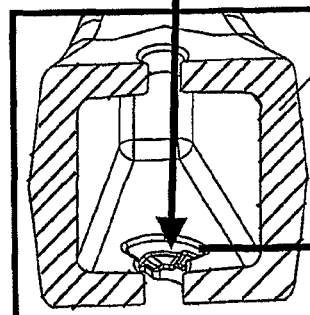
Figure 31:
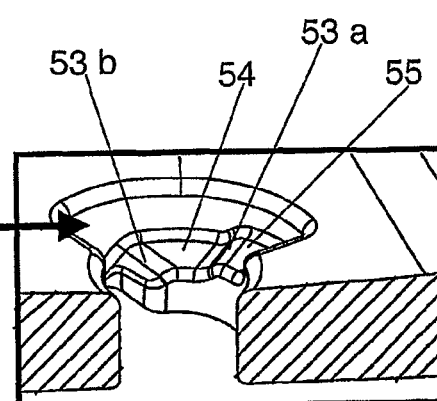

Another embodiment of the invention, represented in FIGS. 30 and 31, shares the same technical principle as the one described in FIGS. 26 to 29, with two downwardly inclined surfaces 53*a* and 53*b*, separated from one another by a planar surface 54, and said surfaces located on the inner wall or surface of the tooth 10. In this embodiment, after the inclined surface 53 the inner wall or surface of the tooth 10 has another planar surface 55 where the run of the retainer member 61 of the pin 60 ends, said pin 60 preferably being frustoconical. The tension member 130 used for this embodiment, formed by a metal portion 133 on a resilient portion 134, preferably with a curved segment shape, has its upper surface planar, straight and inclined, corresponding to the metal portion, with respect to its lower surface which is planar and straight, corresponding to its resilient portion.

Figure 32:
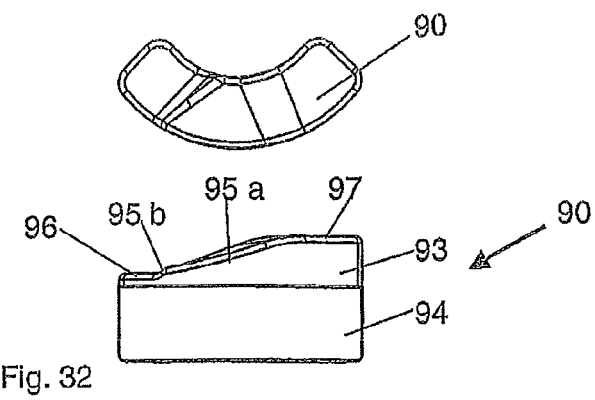
FIG. 32 shows two views of a tension member according to an alternative embodiment of the invention.
Figure 33:
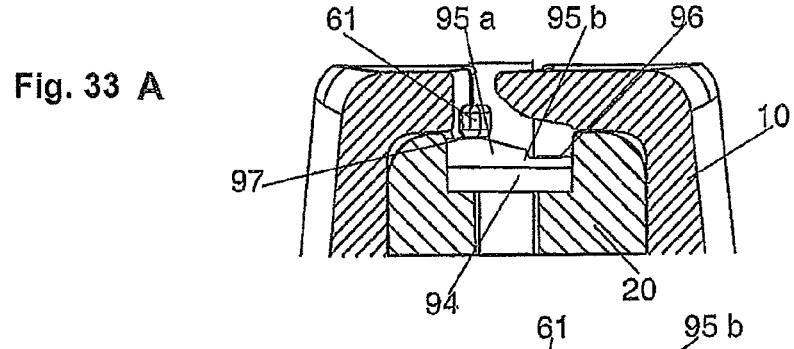
FIGS. 33A-C show three successive views showing the operation of a device using the tension member of FIG. 32.
Figure 33:
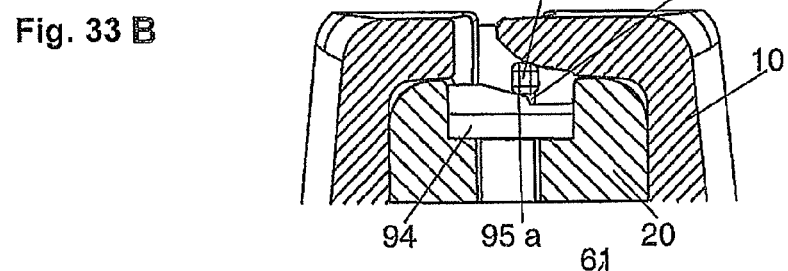
Figure 33:
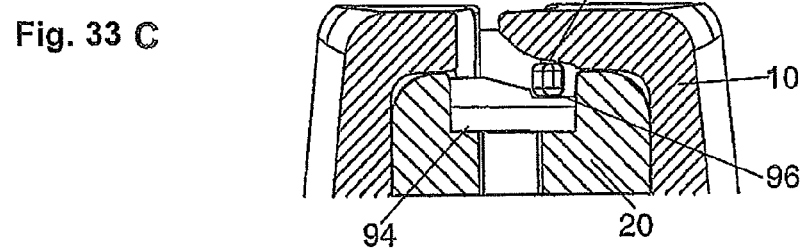

Another embodiment is represented in FIGS. 32 and 33, having the same operating principle as all the embodiments and similar in its construction to the embodiment shown in FIGS. 26 to 29. In this variant the tension member 90 has, as in the others, a metallic member 93 placed on top of a resilient portion 94, the upper surface of the metal portion 93 of the tension member having a first planar surface 97 followed by an inclined surface 95*a*, after which there is arranged a second inclined surface 95*b* and ending in a second planar surface 96. The second inclined surface 95*b* is almost perpendicular to planar surfaces 97, 96. The operation of this embodiment is similar to the previous ones, providing the fixing system with a self-tightening system.

This device facilitates the extraction of the pin from its housing given that when the disassembly tool is turned, the pin comes out due only to the effect of the tension member which pushes it outwards. The height difference between the first planar surface 97 of the tension member 90 and the second planar surface 96 of said tension member 90 is the run of the axial displacement of the pin, allowing the arrangement of part of the pin outside of its housing prior to the introduction of the pin in the housing. This device is preferably applicable in dredging systems.

In another embodiment shown in FIGS. 34 to 39, the tension member 113, 123 could be mounted or constructed on the pin 110, 120, specifically on the retainer member 111, 121 and having facing inclined surfaces defining a rib 14, 125 either on the inner surface of the tooth 10 or on the outer surface of the tooth bar 20.

Figure 34:
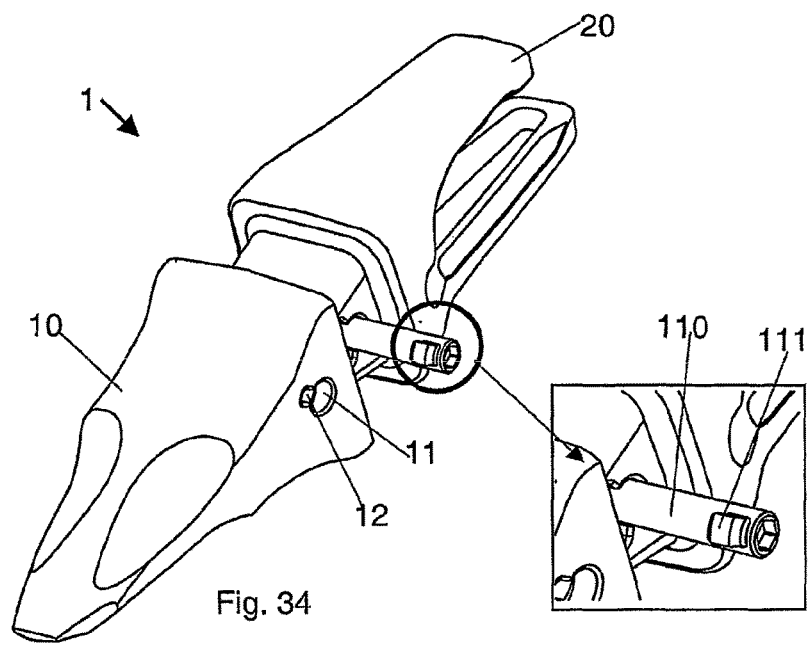
FIG. 34 shows a perspective view of a tooth-tooth bar assembly of a bucket of an excavating machine with a device according to an embodiment of the invention.
Figures 35, 36:
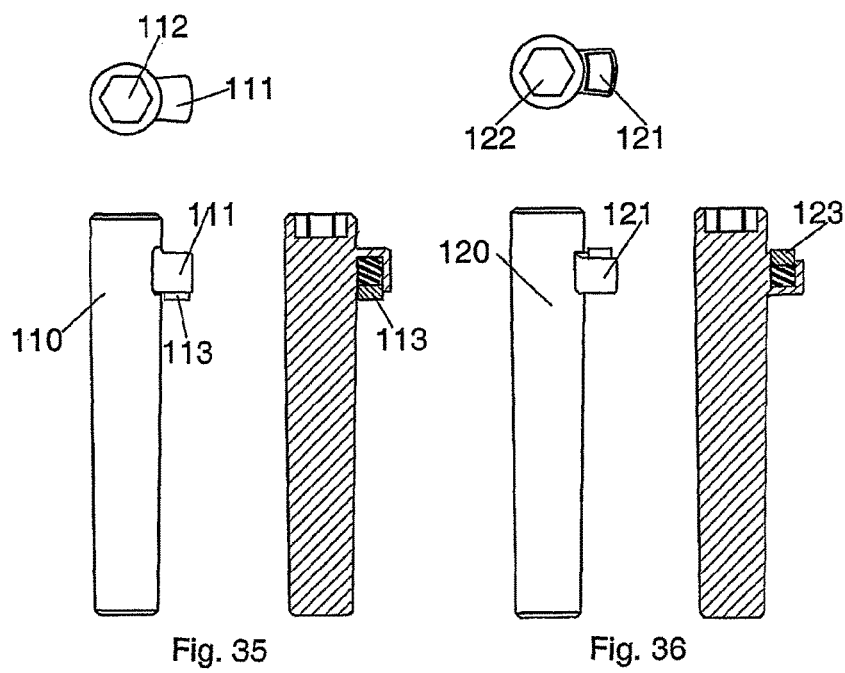
FIG. 35 shows a plan, elevational and sectional view of a pin.
FIG. 36 shows a plan, elevational and sectional view of a pin.

Specifically, and in view of FIGS. 34, 35 and 37, the tension member 113 is located on the lower portion of the retainer member 111 of the pin 110, locating the facing inclined surfaces 13*a*, 13*b* defining a rib 14 on the inner surface of the tooth 10, a housing 15 remaining for the retainer member 111 in its assembly position. In this device, the pin 110 carries out an axial rotation and translation displacement.

Figure 38:
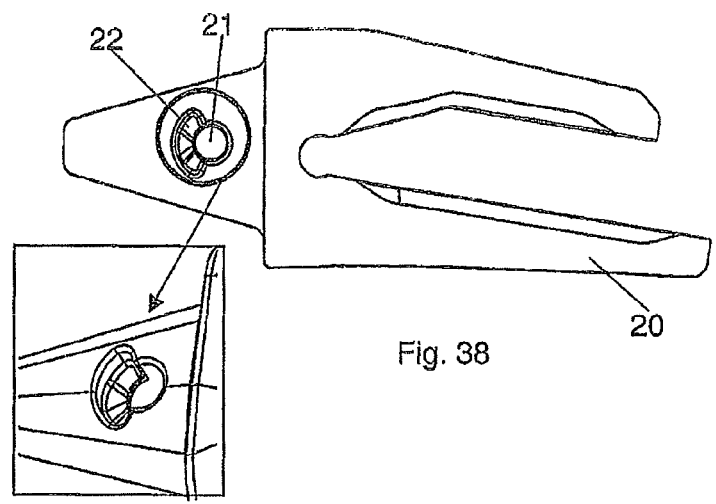
FIG. 38 shows a side view of a tooth bar according to an embodiment of the invention applicable with the pin of FIG. 35 or FIG. 36.
Figure 39:
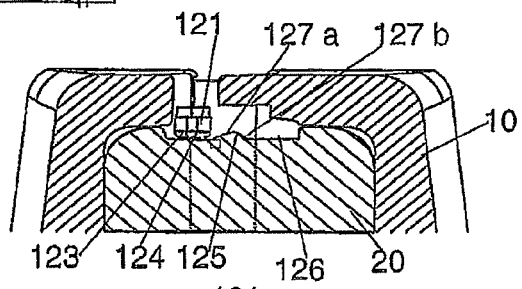
FIGS. 39A-C show three successive views showing the operation of a device according to an embodiment of the invention with the pin of FIG. 36 and the tooth bar of FIG. 38.
Figure 39:
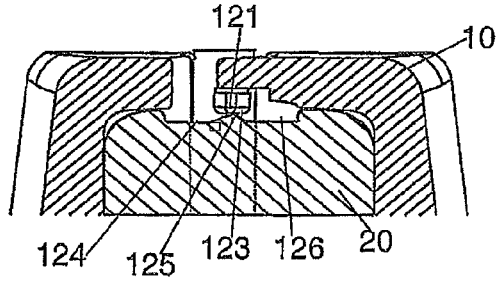
Figure 39:
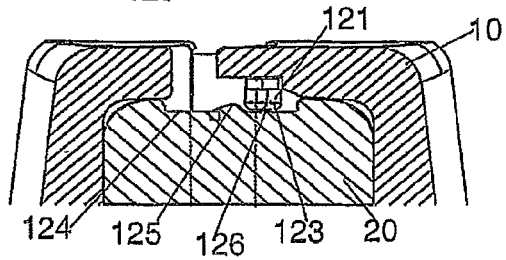

However in view of FIGS. 36, 38 and 39, if the tension member 123 is located in the upper portion of the retainer member 121 of the pin 120, the facing inclined surfaces 127*a*, 127*b* defining a rib 125 must be located on the outer surface of the tooth bar 20, preceded on both sides by planar surfaces 124, 126. In this case, the displacement of the pin is also axially rotational and translational.

Both configurations can be alternated according to the working requirements, being able to change the movements carried out by the pin.

On the other hand, the specific shape of the inclined surfaces may be any shape suitable for facilitating the rotation of the pin from the unlocking position to the lock position and at the same time preventing the retainer member from being released from the lock position during normal working of the excavator. It is also possible to arrange more than two inclined surfaces if the embodiment so requires, mainly in those embodiments allowing several tightening positions between the tooth and tooth bar as the tooth bar becomes deformed.

The invention has been described making reference to several specific embodiments, but a person skilled in the art could combine the different embodiments according to the application requirements and introduce variations and replace some members with other technically equivalent members, which will also be comprised within the scope of protection defined by the attached claims.

The invention claimed is:

1. An assembly comprising:
    a female part having a cavity with a cavity opening;
    a male part having a complementary nose configured to be inserted through the cavity opening and received in the cavity;
    a pin for securing the female part with the male part, the pin comprising a shaft having a longitudinal axis and a retainer member extending therefrom;
    the male and female parts each having a respective pin opening passing through a wall thereof, wherein the pin openings overlap when the nose is inserted in the cavity to axially receive the pin, which is configured to turn in a first direction in the pin openings to lock the nose to the cavity; and
    a tension member disposed between the male and female parts adjacent the pin openings, the tension member configured to engage and to be resiliently loaded by the retainer member when the pin is turned in the first direction, thereby preventing the pin from turning in a second direction opposite the first direction; the tension member comprising a ramp on a front surface thereof such that when the retainer member rotates in the first direction, said retainer member runs along said ramp moving between at least two positions against a force exerted on the pin in a longitudinal axial direction of the pin by said tension member, and a back surface opposite the ramp which engages an opposing surface of the male part;
    wherein in a locked configuration, a surface of the retaining member engages an opposing surface of the female part so that the retaining member is resiliently clamped between the tension member and the female part;
    wherein the ramp has a first configuration comprising a lower inclined surface followed by a planar portion followed by an upper inclined surface, or a second configuration comprising a lower flat surface followed by an inclined surface which is stepped-up from the flat surface in the longitudinal axial direction of the pin; and
    wherein each of the inclined surfaces are inclined relative to a plane perpendicular to the longitudinal axial direction of the pin and inclined relative to a plane parallel to the longitudinal axial direction of the pin.

2. The assembly according to claim 1, wherein the inclined surfaces are formed on one face of the tension member.

3. The Assembly according to claim 1, wherein the ramp comprises the first configuration and the lower inclined surface and the upper inclined surface form at least two inclined ramps, one after the other and separated by the planar portion, one of the ramps having a steeper slope than the other one.

4. The device according to claim 1, wherein the pin has the shape of a surface of revolution.

5. The device according to claim 4, wherein the pin is frustoconical.

6. The device according to claim 1, wherein the pin has a circular section.

7. The device according to claim 1, wherein the pin has an elliptical section.

8. The device according to claim 1, wherein the retainer member constitutes a transverse projection of the pin.

9. The device according to claim 8, wherein the retainer member is joined to the pin.

10. The device according to claim 1, wherein one of the ends of the pin has a coupling for a tool by means of which it is possible to apply a rotational movement to said pin about its longitudinal axis.

11. The device according to claim 1, wherein the tension member is a curved segment.

12. The assembly according to claim 1, wherein the ramp comprises the second configuration and the inclined surface is followed by an upper flat surface, such that the lower flat surface, the inclined surface, and the upper flat surface are directly subsequent to each other along the ramp.

13. The assembly according to claim 1, wherein the ramp comprises the first configuration, such that, when the retainer member is guided from the lower inclined surface along the ramp in the axially direction, the retainer member moves to a higher level along the ramp.

* * * * *